Sept. 12, 1961 S. C. SHAPPELL 2,999,299
BASE THREADING AND WELDING METHOD AND APPARATUS
Filed Oct. 29, 1956 12 Sheets-Sheet 1

INVENTOR
STANLEY C. SHAPPELL
BY Joseph C. Ryan
ATTORNEY

Sept. 12, 1961  S. C. SHAPPELL  2,999,299
BASE THREADING AND WELDING METHOD AND APPARATUS
Filed Oct. 29, 1956  12 Sheets-Sheet 2

INVENTOR
STANLEY C. SHAPPELL
BY Joseph C. Ryan
ATTORNEY

Sept. 12, 1961  S. C. SHAPPELL  2,999,299
BASE THREADING AND WELDING METHOD AND APPARATUS
Filed Oct. 29, 1956  12 Sheets-Sheet 4
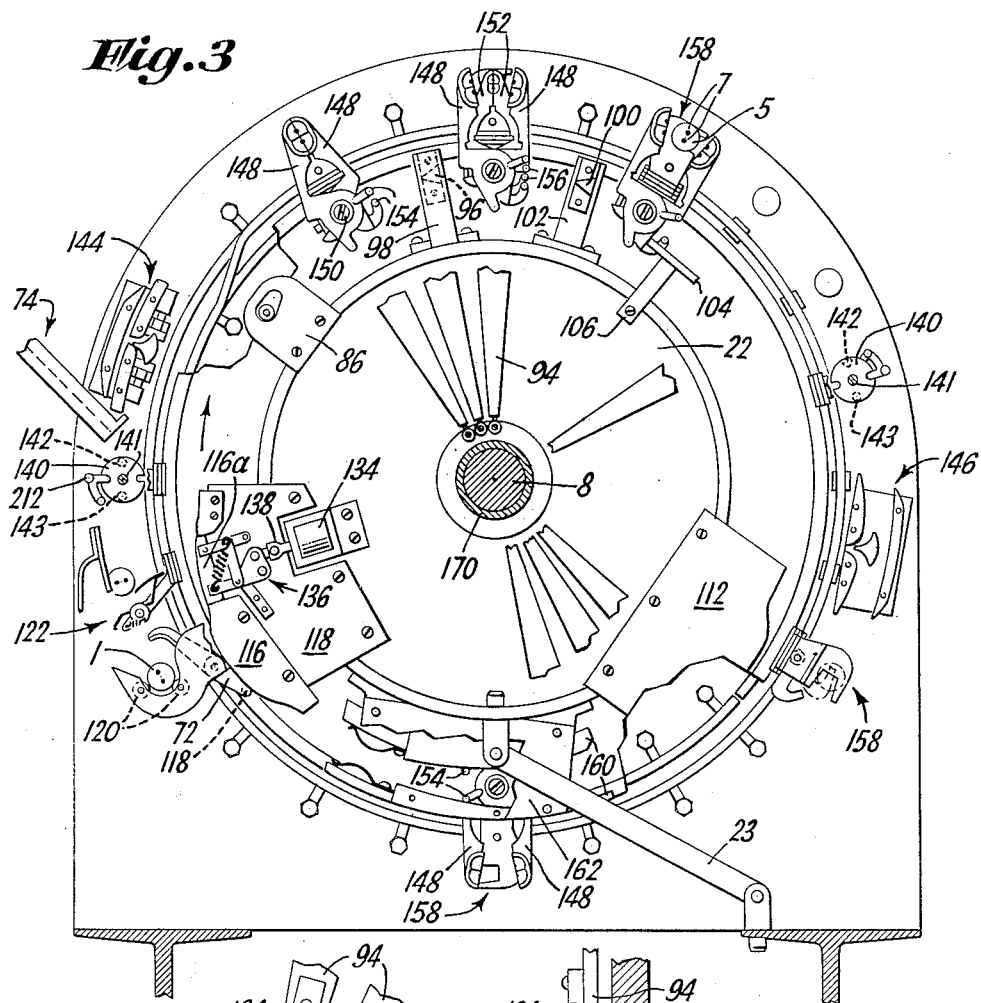
INVENTOR
STANLEY C. SHAPPELL
BY
ATTORNEY

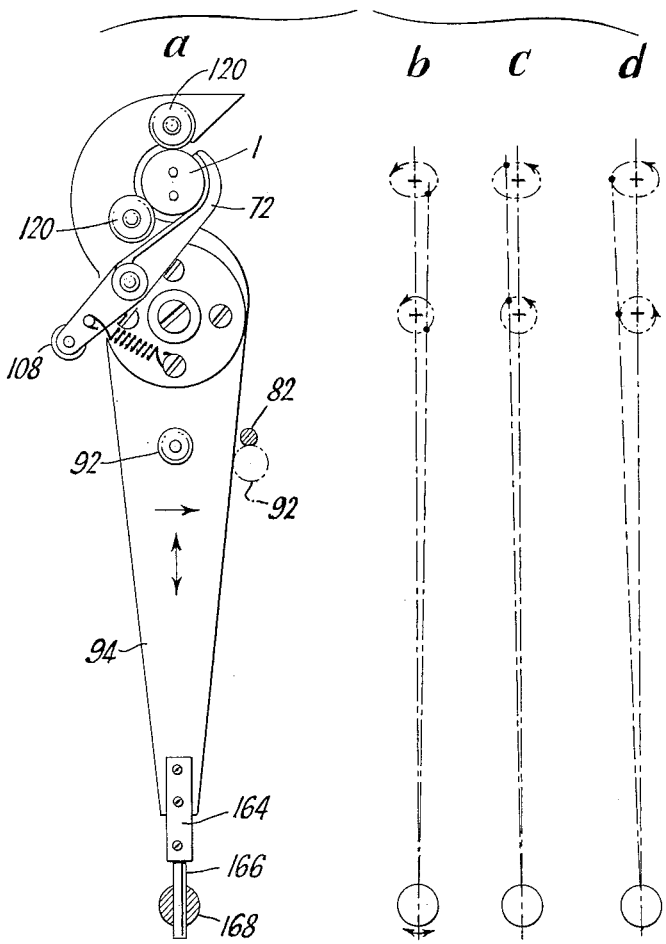

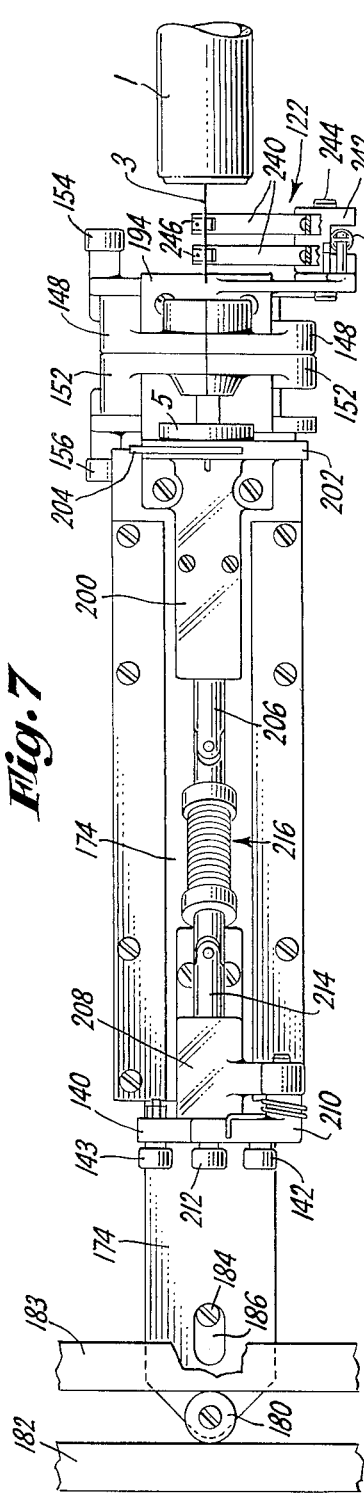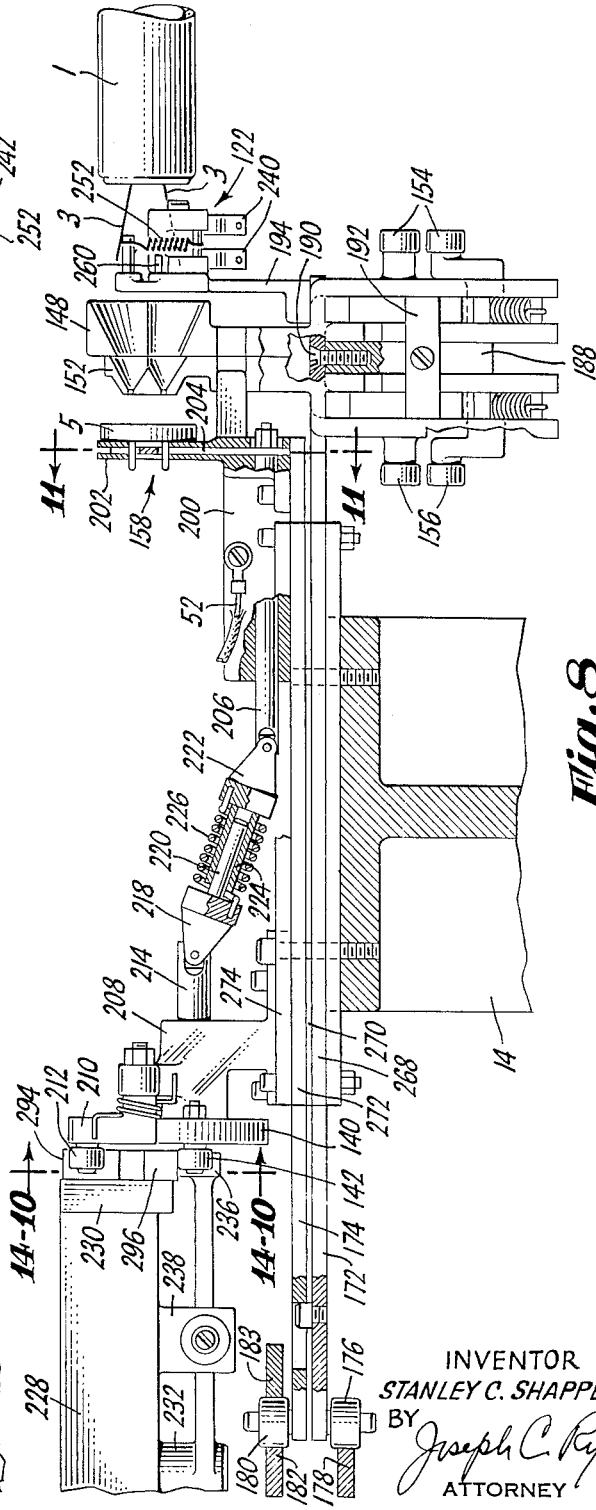

Sept. 12, 1961 S. C. SHAPPELL 2,999,299
BASE THREADING AND WELDING METHOD AND APPARATUS
Filed Oct. 29, 1956 12 Sheets-Sheet 7

INVENTOR.
BY STANLEY C. SHAPPELL
ATTORNEY

Sept. 12, 1961 S. C. SHAPPELL 2,999,299
BASE THREADING AND WELDING METHOD AND APPARATUS
Filed Oct. 29, 1956 12 Sheets-Sheet 8

INVENTOR
STANLEY C. SHAPPELL
BY Joseph C. Ryan
ATTORNEY

INVENTOR.
STANLEY C. SHAPPELL
BY Joseph C. Ryan
ATTORNEY

Sept. 12, 1961 S. C. SHAPPELL 2,999,299
BASE THREADING AND WELDING METHOD AND APPARATUS
Filed Oct. 29, 1956 12 Sheets-Sheet 10
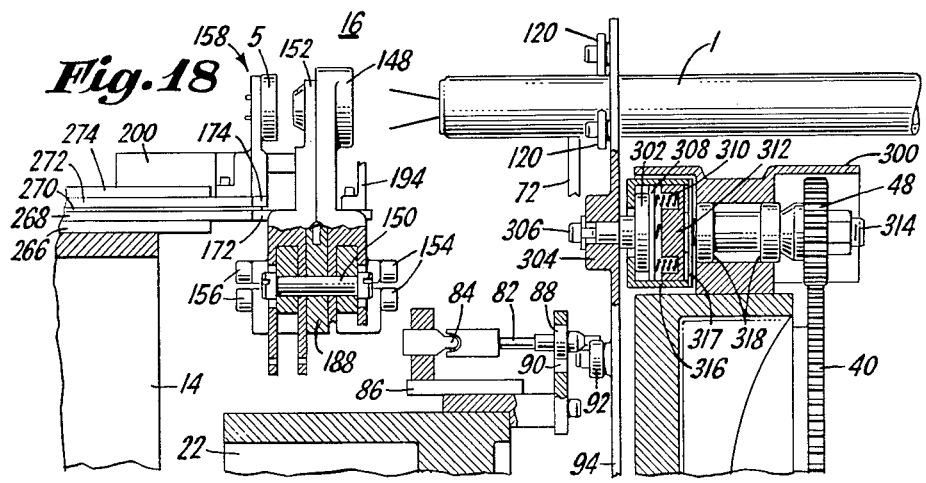
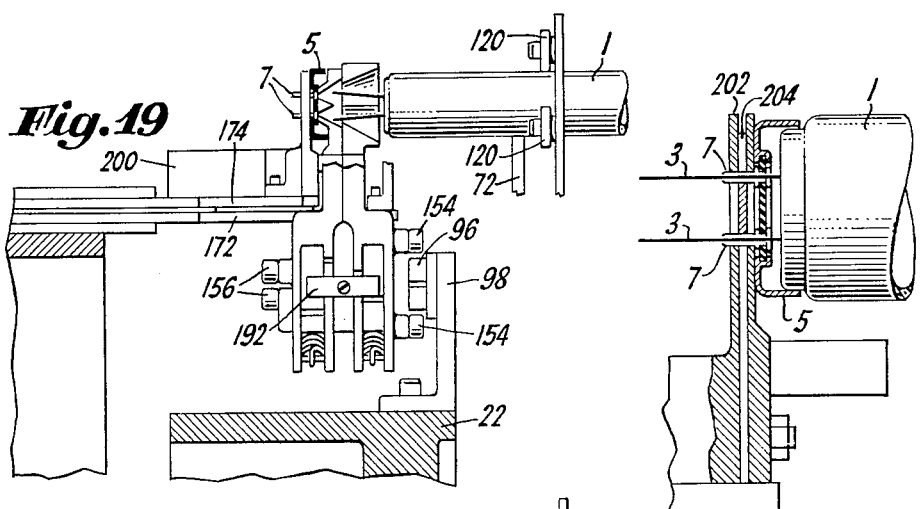
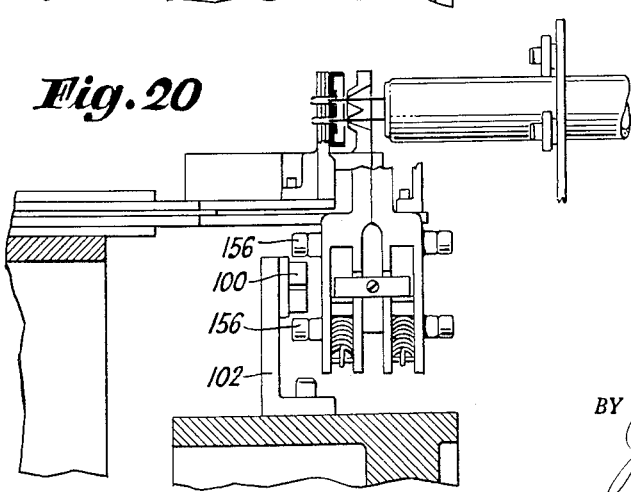
INVENTOR.
STANLEY C. SHAPPELL
BY Joseph C. Ryan
ATTORNEY INVENTOR
STANLEY C. SHAPPELL
BY Joseph C. Ryan
ATTORNEY Sept. 12, 1961  S. C. SHAPPELL  2,999,299
BASE THREADING AND WELDING METHOD AND APPARATUS
Filed Oct. 29, 1956  12 Sheets-Sheet 12

United States Patent Office 2,999,299
Patented Sept. 12, 1961

2,999,299
BASE THREADING AND WELDING METHOD AND APPARATUS
Stanley C. Shappell, West Boxford, Mass., assignor, by mesne assignments, to Sylvania Electric Products Inc., Wilmington, Del., a corporation of Delaware
Filed Oct. 29, 1956, Ser. No. 618,790
5 Claims. (Cl. 29—25.13)

This invention relates to the manufacture of electrical devices provided with bases through which lead-in wires extend, and more particularly to threading lead-in wires of electrical devices into the bases with which the electrical devices are provided.

In the manufacture of electrical devices, such as fluorescent lamps for example, each end of the lamp envelope is provided with a base having electrical contact pins extending therefrom. Lead-in wires, projecting from each end of the lamp envelope, extend into the base pins and are securely attached thereto. Thus one of the operations in the manufacture of a fluorescent lamp is threading of the lamp lead-in wires into the pins of the lamp base. Heretofore this operation has been performed manually or semi-automatically with the aid of jigs and the like.

An object of this invention is to thread lead-in wires into base pins automatically.

Another object of this invention is to provide an apparatus for threading lead-in wires into base pins automatically.

A further object of this invention is to provide an apparatus for automatically threading lead-in wires into base pins at each end of an elongated tubular electrical device simultaneously.

A further object is to provide the apparatus of this invention with means for securing the lead-in wires of an electrical device to the base pins immediately after the threading operation has been effected.

These and other objects, advantages and features of the invention will be apparent to those skilled in the art from a study of a specific embodiment thereof shown in the accompanying drawings and described below.

In one embodiment of our invention, an electrical device, such as a fluorescent lamp for example, having a pair of lead-in wires projecting from each end thereof is held intermediate its ends by a pair of arms. A threader and a lamp base are disposed in axial alignment with the lamp at each end thereof and in proximity thereto, the threader being located between the end of the lamp and the base. The arms which hold the lamp are actuated to revolve the lamp about an axis, and the threaders are advanced into encompassing relationship with respect to the lead-in wires projecting from the ends of the revolving lamp to draw the lead-in wires into axial alignment with their respective pins in the lamp bases. After the threaders have been advanced a distance sufficient to effect entry of the lead-in wires into their respective base pins, the threaders are withdrawn from axial alignment with the lamp, revolving of the lamp is terminated, and the bases are advanced into engagement with the ends of the lamp to effect advancement of the free ends of the lead-in wires through their respective base pins to complete the threading operation. The lamp is then advanced to a position where each end thereof is in operative relationship with respect to a welding unit which effect a welding of the lead-in wires to the base pins and a severance of the excess part of the lead-in wires.

In the specific embodiment of my invention illustrated in the accompanying drawings:

FIGURES 1a and 1b, taken as one drawing, is a front elevational view, partly in section, of a base threading and welding machine.

FIGURE 3 is a transverse sectional view of the base threading and welding machine of FIGURES 1a and 1b, looking in the direction 3—3 of FIGURE 1a, illustrating the mechanisms employed to actuate the various devices shown in FIGURE 2.

FIGURE 4 is a fragmentary detail, on an enlarged scale, of the lower end of a lamp head arm and its associated parts.

FIGURE 5 is a fragmentary detail, on an enlarged scale, of the lower end of a lamp head arm and its associated parts, taken 90 degrees from FIGURE 4.

FIGURE 6a is a front elevational view of a lamp head arm, as seen looking in the direction 6—6 of FIGURE 1b; "b," "c" and "d" of FIGURE 6 schematically illustrating the revolution of a lamp tube.

FIGURE 7 is a plan view of a threading head assembly.

FIGURE 8 is a side elevational view, partly in section, of the threading head assembly of FIGURE 7.

FIGURES 14–17 inclusive are fragmentary details, partly in section, looking in the direction 14—14 of FIGURE 8, illustrating sequentially the operation of the operating clamp driver of the base clamping device.

FIGURES 18–21 inclusive are fragmentary details, partly in section, of a threading head assembly and its associated lamp head arm assembly, illustrating sequentially the base threading operation.

Figure 22:
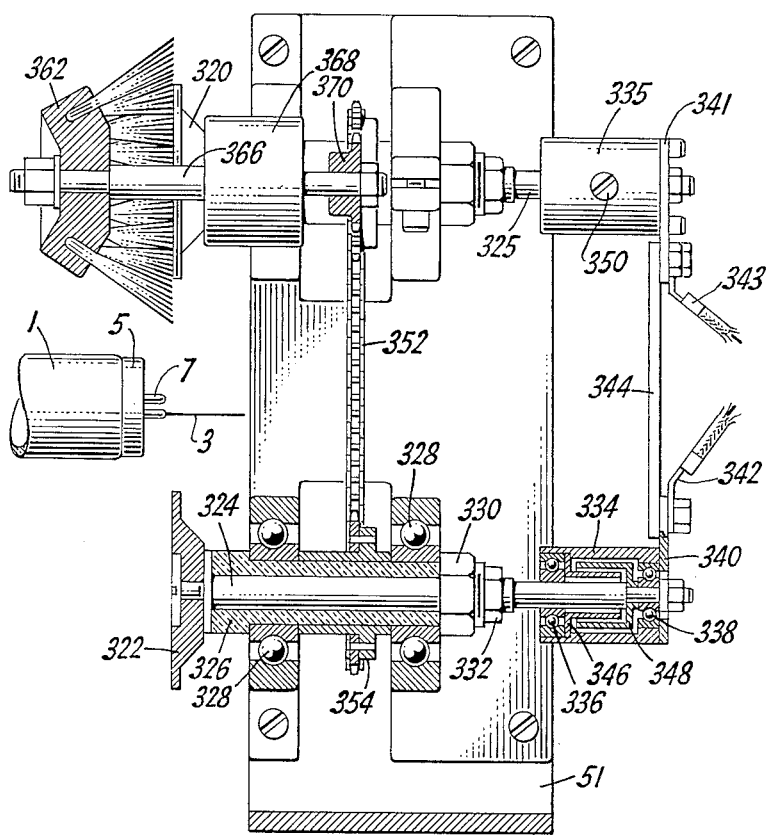
Figure 24:
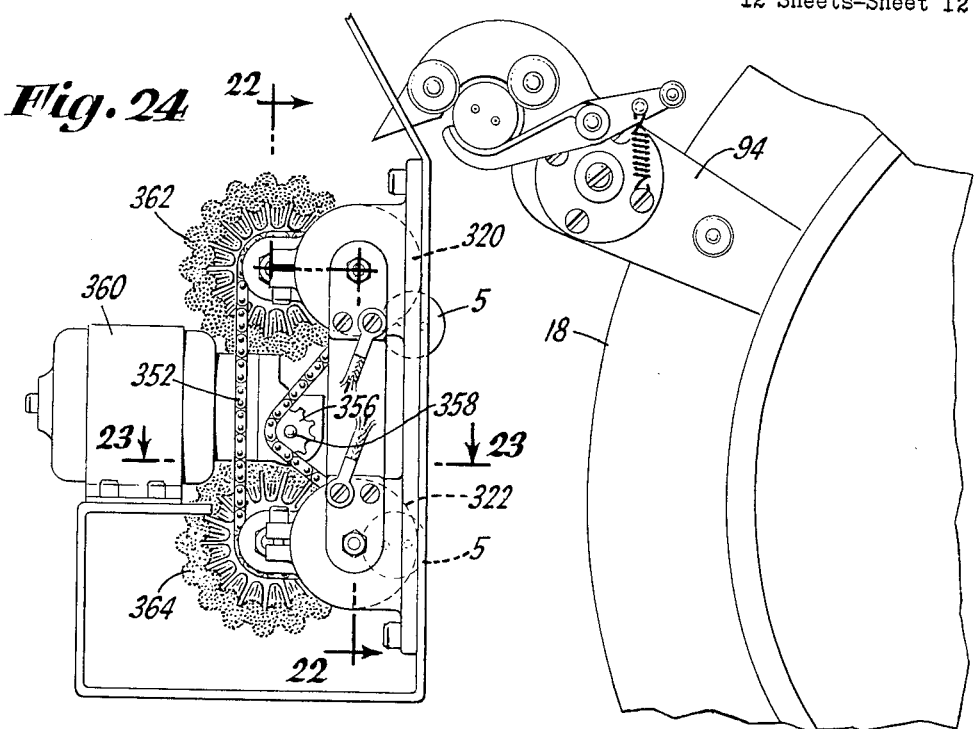

FIGURE 22 is an elevational view partly in section, of the pin welding unit, looking in the direction 22—22 of FIGURE 24.

Figure 23:
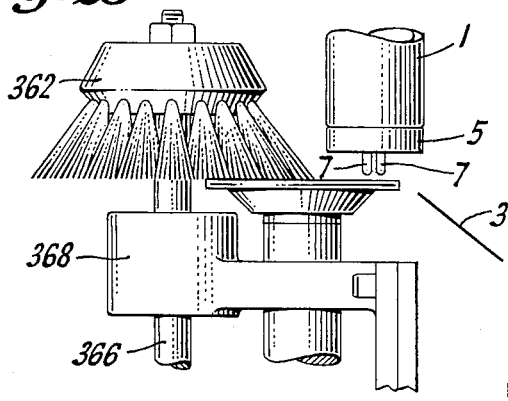

FIGURE 23 is a fragmentary detail of a pin welding unit electrode assembly.

FIGURE 24 is an end view of the pin welding unit and a fragmentary detail of a lamp head arm assembly moving into operative relationship with respect thereto.

Figure 25:
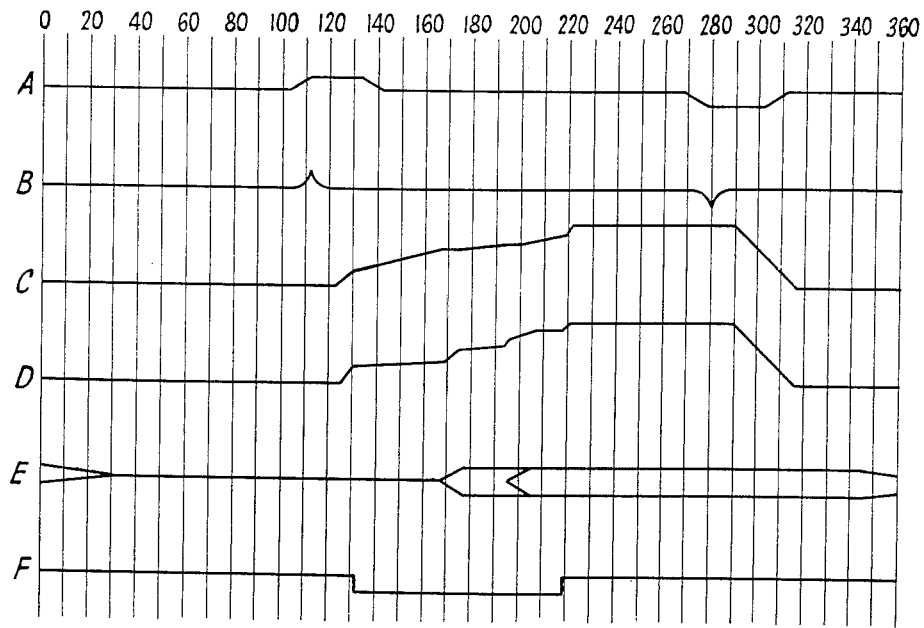

FIGURE 25 is a developed schematic diagram illustrating the action of several of the operating devices of the base threading apparatus and the time, in terms of degrees, during one full operating cycle of the machine, when these devices are actuated.

Figure 1A:
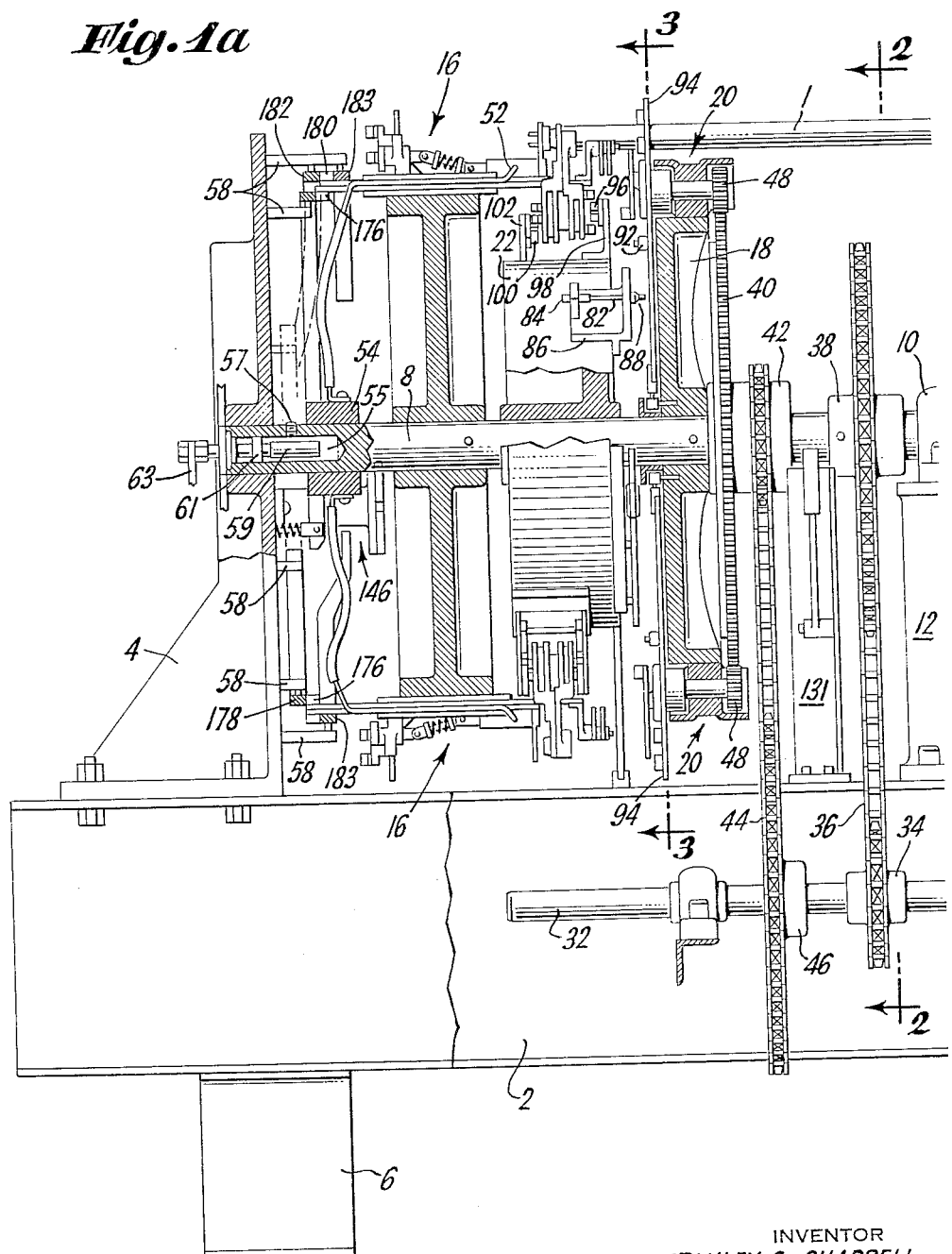
Figure 1B:
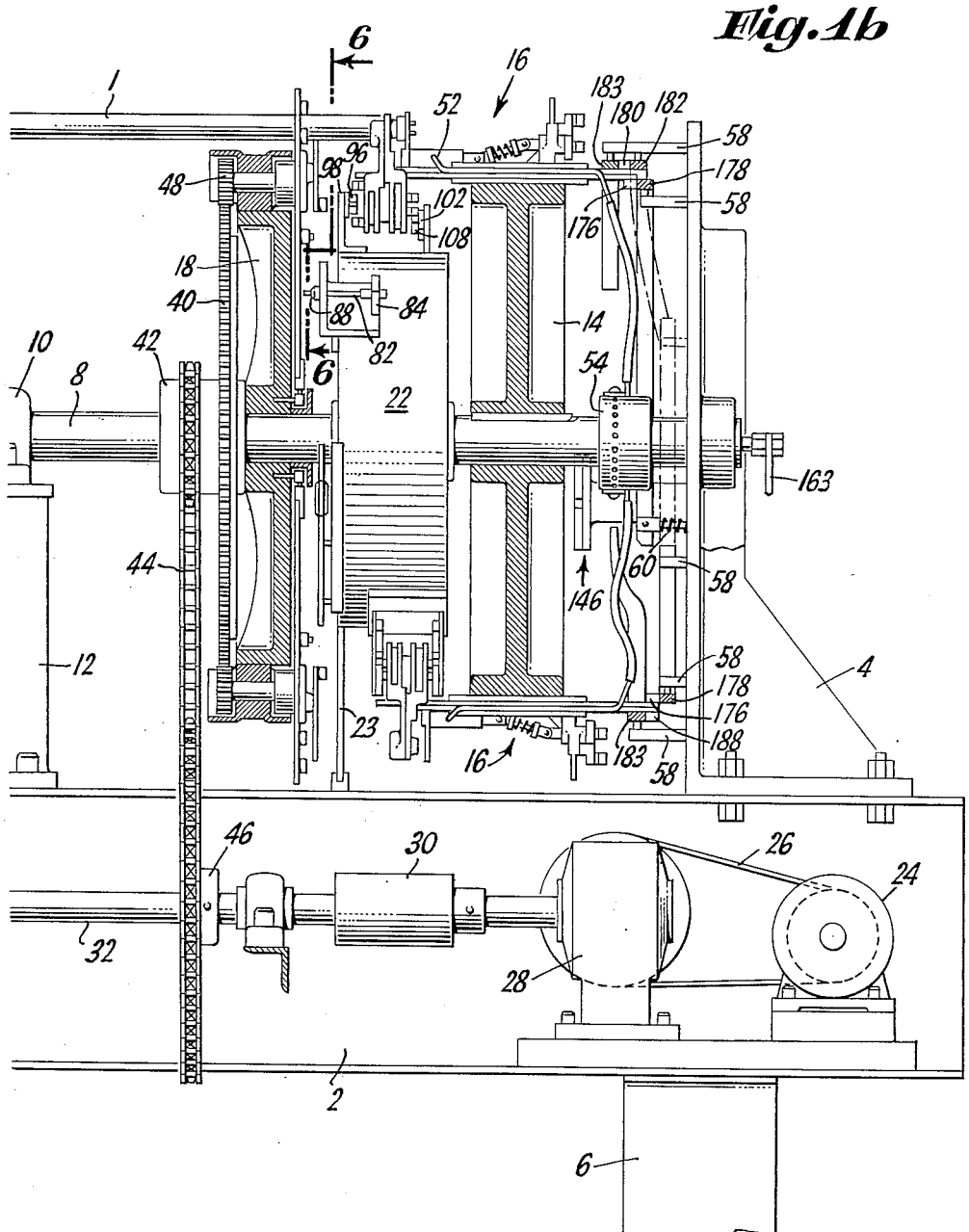

Referring now to the drawings, particularly FIGURES 1a and 1b, the frame of the apparatus comprises a base weldment 2 on which a pair of end pedestals 4 are mounted, the base weldment 2 being supported by foot weldments 6. Shaft 8 is supported on bearings in end pedestals 4 and bearing 10 on bearing pedestal 12. A pair of threading head spiders 14, about the periphery of which a plurality of threading head assemblies 16 are mounted, are keyed to shaft 8. A pair of lamp head spiders 18, on which a plurality of lamp head assemblies 20 are supported, are keyed to shaft 8. A stationary cam drum 22, supported in bearings on the shaft 8 and prevented from rotating thereon by the torque arm 23, is disposed between the threading head spider 14 and the lamp head spider 18 at each end of the apparatus.

The shaft 8 is driven by motor 24 which is connected thereto through belt 26, worm gear drive 28, coupling 30, main drive shaft 32, sprocket 34 which is keyed to shaft 32, chain 36, and sprocket 38 which is keyed to shaft 8. A pair of gears 40, supported in bearings on the shaft 8, are driven by sprockets 42 keyed thereto, the sprockets 42 being connected to a suitable drive, such as, for example, the main drive shaft 32 through chains 44 and sprockets 46 keyed to the main drive shaft 32. The gears 40 mesh with pinions 48 with which each of the lamp head assemblies 20 are provided.

Grounding of each head assembly 16 is effected by a grounding wire 52 running from the head assembly 16 to a terminal collar 54 on shaft 8. Each end of shaft 8 is provided with a chamber 55 within which a pool of mercury is disposed. The shaft 8 is provided with a port through which mercury may be introduced into the chamber 55 and a plug 57 to close the port. A terminal post 59, disposed in the pool of mercury in chamber 55 and extending through bearing 61, is connected at its outer end to ground lead 63.

Each of the stationary cam drums 22, as was mentioned above, is disposed between a threading head spider 14 and a lamp head spider 18. Each cam drum 22 is provided with a plurality of cams, described more fully below, for actuating certain portions of each threading head assembly 16 and each lamp head assembly 20 during each operating cycle of the apparatus. Additional cams for actuating certain portions of each threading head assembly 16 are rigidly mounted on posts 58 on end pedestals 4. Certain segments of some of these cams, as will be described more fully below, are resiliently mounted on spring loaded pins 60 on end pedestals 4.

Figure 2:
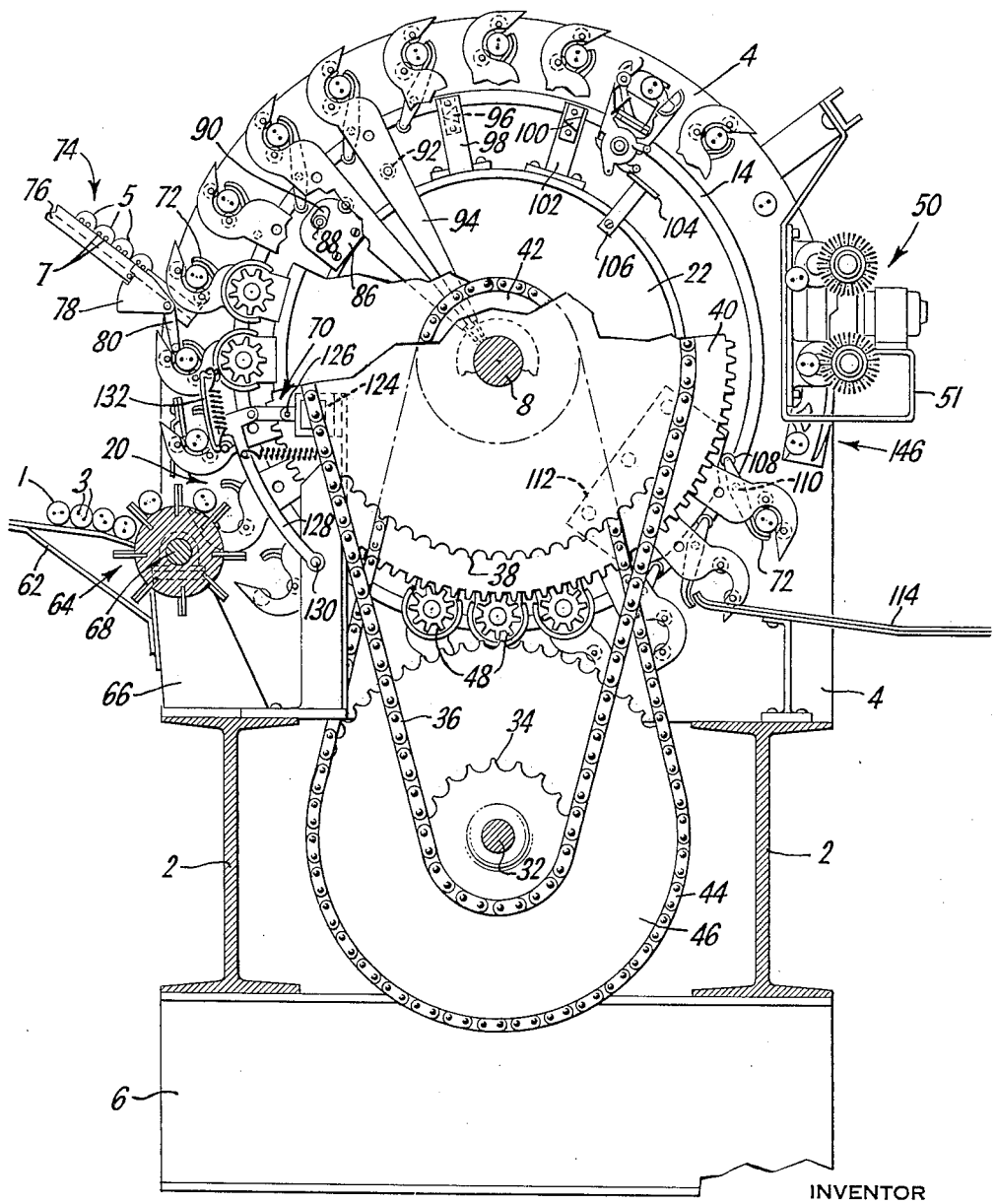
FIGURE 2 is a transverse sectional view of the base threading and welding machine of FIGURES 1a and 1b, looking in the direction 2—2 of FIGURE 1a, illustrating the relative location of the various devices which operate on the work during a cycle of the machine.

Referring now to FIGURE 2, and reading it in conjunction with FIGURES 1a and 1b, lamp tubes 1 are fed to the apparatus from an inclined table 62 through a paddle wheel feeder 64 supported on brackets 66 attached to base weldment 2 adjacent to each end thereof. The shaft 68 of the paddle wheel feeder 64 is driven, by means not shown, in timed relationship to the main drive shaft 32 so that a lamp tube 1 is fed to each lamp head assembly 20 which carries the lamp tube 1 through an operating cycle of the apparatus.

The first operation on the lamp tube 1 is orientation of the lead-in wires 3 extending from each end of the lamp tube. This is accomplished by a tube rotating unit, indicated generally by the reference numeral 70. When the lamp tube 1 has been rotated sufficiently to bring the lead-in wires 3 into the desired orientation, rotation of the lamp tube 1 is terminated and a rotatable jaw 72 of the lamp head assembly 20 clamps the lamp tube securely in position by means to be described below.

The next operation is feeding of a lamp base to a position in axial alignment with the lamp tube at each end thereof. This is accomplished by a base feeding device indicated generally by the reference numeral 74. The base feeding device 74 comprises an inclined feeding track 76 provided with a supply of bases 5 and an escapement 78. Actuation of the escapement 78 to release a base 5 from the track 76 is effected by a finger 80 depending from the escapement 78 and normally lying in the path of a lamp tube 1. During the course of its travel, the lamp tube 1 moves into engagement with the finger 80 and deflects it, thereby causing actuation of the escapement 78 and release of a lamp base 5 to a base holding device, to be described below, of the threading head assembly 16. When no lamp is present in the lamp head, the finger 80 is not deflected, the escapement is not actuated and a base is not released.

At this point in the operating cycle, the lamp tube 1 is firmly held by the jaw 72 of the lamp head assembly 20 and a base 5 is disposed in axial alignment with the lamp tube at each end thereof. Initiation of the wire threading operation is now effected. This is accomplished by revolving the lamp about an axis and, at the same time, moving a pair of split threading cones, to be described below, into operative relationship with respect to the lead-in wires of the revolving lamp. As will appear from the description below of some of the other figures of the drawings, the two split threading cones, which are part of the threading head assembly 16, are disposed between each end of the lamp and a base held by the base holding device of the threading head assembly 16, and in axial alignment therewith. Thus, as the lamp tube revolves and the two split cones move into encompassing relationship with respect to the lead-in wires 5 of the lamp tube 1, the lead-in wires 5 are gradually deflected and guided by the inner walls of the cones into axial alignment with the pins 7 of the base 5 and finally threaded thereinto.

Revolution of the lamp tube 1 is triggered by a rod 82 (FIGS. 1a and 1b) pivotally mounted at 84 in bracket 86 mounted on cam drum 22. The rod 82 is provided with a roller 88 which rides within slot 90 (FIG. 2) in bracket 86, the slot 90 defining the limits of the movement of rod 82. The free end of rod 82 lies in the path of a roller 92 on lamp head arm 94. Thus when lamp head arm 94 moves past rod 82, the force exerted by the free end of rod 82 on roller 92 on the arm 94 displaces the arm 94 downwardly a distance sufficient to actuate the mechanism described below for revolving the lamp tube.

With the lamp tube now revolving, the pair of split threaded cones mentioned above are now advanced towards each end of the lamp tube to gradually encompass the lead-in wires of the lamp tube and deflect them to threading position. When the first threading cone has performed its work, the jaws thereof are opened by cam 96 mounted on bracket 98 on cam drum 22. When the second threading cone has performed its work, the jaws thereof are opened by cam 100 mounted on bracket 102 mounted on cam drum 22. Since the base holding device to be described below is mounted in proximity to the second threading cone, the lead-in wires of the lamp tube have been partially threaded into the base pins before the second threading cone opens. With both threading cones open, the base is advanced further toward each end of the lamp tube and revolving of the lamp continues to completion of the threading of the lead-in wires until the free ends of the lead-in wires have passed through the base pins. Revolution of the lamp tube is arrested when the roller 92 on lamp head arm 94 moves into engagement with and rides over cam 104 mounted on bracket 106 on cam drum 22.

With a base in engagement with each end of the lamp tube and the lead-in wires extending through the base pins, the lamp tube is now carried by the lamp head arm 94 to the welding unit 50, mounted on a bracket 51 attached to end pedestal 4, where the lead-in wires are welded to the base pins. Following this welding operation, a cam follower 108 on jaw 72, which is pivotally mounted at 110 on lamp head arm 94, rides over cam 112 mounted on cam drum 22. The contour of cam 112 is such that, as the cam follower 108 rides over it, the jaw 72 is opened, releasing the lamp tube which then rolls down table 114 mounted on base weldment 2.

Referring now to FIGURE 3, and reading it in conjunction with FIGURES 1a, 1b and 2, more of the mechanisms for actuating some of the operating devices of the apparatus of this invention will now be described.

As the lamp head assemblies 20 approach the lamp tube feeding position, where lamp tubes are fed to the apparatus by the paddle wheel feeder 64 (FIG. 2), cam follower 108 on jaw 72 of each lamp head assembly 20 rides up on cam 116 (FIG. 3) mounted on plate 118 attached to cam drum 22, thereby opening jaw 72 and permitting rollers 120 on each lamp head arm 94 to receive a lamp tube. With the lamp tube 1 supported freely on the rollers 120, the lamp tube 1 is carried into engagement with the tube rotating unit 70 (FIG. 2)

which lies in its path, thus effecting rotation of the lamp tube. Rotation of the lamp tube 1 by the tube rotating unit 70 is continued until one of the lead-in wires extending from one end of the lamp tube moves into engagement with a switching device indicated generally by the numeral 122 (FIG. 3) and described more fully below. Engagement of one of the lead-in wires of the lamp tube 1 by the switching device 122 closes an electrical circuit and energizes solenoid 124 (FIG. 2) of the tube rotating unit 70, causing the solenoid plunger 126 to retract and draw with it the shoe 128 which is pivotally mounted at 130 and the shoe facing 132 on which the lamp tube 1 rotated.

Engagement of one of the lead-in wires of the lamp tube 1 by the switching device 122 also closes another electrical circuit which energizes solenoid 134 (FIG. 3) mounted on cam drum 22 to effect a closing of jaw 72 about the lamp tube. The cam 116 which keeps the spring-loaded jaw 72 open is provided with a cam segment 116a mounted on linkage 136 connected to solenoid plunger 138. Thus retraction of plunger 138 upon energization of solenoid 134 effects a withdrawal of cam segment 116a from the path of cam follower 108 on jaw 72 and permits jaw 72 to snap closed on the lamp tube.

The lamp tube 1, held securely near each end thereof in a lamp head assembly 20, is now carried into position to have a base fed from a base feeding device 74 to a position in axial alignment therewith at each end thereof. Each threading head assembly 16 (FIGS. 1a and 1b) is provided with a base clamping device, to be described below, which receives a base from the feeding device 74, clamps it securely in position for the threading operations, and then releases it. Each base clamping device includes an operating clamp driver 140 (FIG. 3) mounted on a shaft 141 and having a pair of cam followers 142 and 143 mounted thereon. As the threading head assemblies 16 are carried through an operating cycle of the apparatus, the operating clamp driver 140 is actuated first by a base clamping cam assembly 144 to secure a base in the base clamping device and then, upon completion of the base threading operations, by a base releasing cam assembly 146 to release the base from the base clamping device.

The pair of threading cones, which are a part of each threading head assembly 16, are actuated by cams mounted on the cam drum 22, as shown in FIGURE 3. The first threading cone comprises a pair of jaws 148 pivotally mounted on threading cone shaft 150. The second threading cone comprises a pair of jaws 152 pivotally mounted on threading cone shaft 150. As the first threading cone moves past cam 96, the cam followers 154 on the first threading cone jaws 148 are displaced by the cam 96, thereby effecting rotation of the jaws on the shaft 150 and opening of the cone. Similarly, as the second threading cone moves past cam 100, the cam followers 156 on the second threading cone jaws 152 are displaced by the cam 100, thereby effecting rotation of the jaws on the shaft 150 and opening of the cone.

As may be noted at the top of FIGURE 3, when the first and second threading cones are in the open position, the jaws thereof are spread apart enough to permit base clamping device 158, with a base 5 held therein, to be moved in toward the adjacent end of a lamp tube to complete threading of the lamp tube lead-in wires into the base pins 7. In FIGURE 3, the base clamping device 158 is also shown in the open position, after the operating clamp driver 140 has been actuated by the base releasing cam assembly 146.

As was mentioned above in connection with the description of FIGURE 2, upon completion of an operating cycle of the apparatus, a lamp tube is released from the lamp head assemblies 20 when cam follower 108 on jaw 72 rides along cam 112 mounted on cam drum 22. Before another operating cycle is initiated, the threading cones must be closed. This is accomplished by a pair of bar cams 160 attached to a face of cam plate 162 mounted on cam drum 22. As the cam followers 154 of the first threading cone and the cam followers 156 of the second threading cone move through the path defined by the pair of cams 162, the cam followers are displaced toward one another, thereby effecting rotation of the jaws 148 of the first threading cone and jaws 152 of the second threading cone to the closed position.

As was mentioned above in the description of FIGURES 1a and 1b, a pair of lamp head spiders 18 keyed to shaft 8 support a plurality of lamp head assemblies 20. Each lamp head assembly 20 has already been described as comprising an arm 94 having a pair of rollers 120 on which a lamp tube 1 is supported and a jaw 72 which opens and closes to receive and grip a lamp tube. Further details of a lamp head assembly 20 are shown in FIGURES 4, 5 and 6a, to which reference is now made. The lower end of arm 94 has a plate 164 attached thereto and depending therefrom. A dowel pin 166, attached to plate 164 and depending therefrom, extends freely through dowel 168 in the hub of spider 18. A retaining ring 170, pinned to shaft 8 adjacent to the hub of spider 18, defines therewith an enclosure within which dowel pin 166 and the head of dowel 168 are disposed.

As was mentioned above, revolution of the lamp tube 1 is triggered by rod 82, the free end of which lies in the path of roller 92 on lamp head arm 94. The path described is illustrated schematically in FIGURES 6b, c and d; the means employed to initiate the action is illustrated in FIGURE 18 and will be described below in connection with the description of FIGURE 18.

A threading head assembly identified generally in FIGURES 1a and 1b by the reference numeral 16, is illustrated in FIGURES 7 and 8, the former being a plan view and the latter a side elevational view. The threading head assembly 16 comprises a lower slide 172 on which the threading cones are supported, and an upper slide 174 on which the base clamping device and its actuating mechanism are mounted. The lower slide 172 is provided with a cam follower 176 which rides on bar cam 178. The upper slide 174 is provided with a cam follower 180 which rides on bar cam 182, bar cam 183 being provided to limit forward motion and effect a positive return. The lower slide 172 is provided with a screw 184, the head of which lies within slot 186 in upper slide 174, thus providing for utilizing the cam 182 as the driving means for slides 172 and 174 during portions of the operating cycle and permitting independent movement of the slides during other portions of the operating cycle as described below.

A threading cone support 188 is attached to an end of lower slide 172 by screws 190. The threading cone shaft 150, on which the jaws 148 and 152 of the threading cones are mounted, as was mentioned above in the description of FIGURE 3, is rotatably supported in the threading cone support 188. A plate 192, attached to the threading cone support 188, serves as a stop for limiting the extent to which the jaws 148 and 152 of the cones may be opened. Switching device 122, which was also mentioned above in connection with the description of FIGURE 3, is mounted on a bracket 194 attached to lower slide 172.

The base clamping device, identified generally by the reference numeral 158 in the description of FIGURE 3 above, comprises a block 200 mounted on upper slide 174, a base holder 202 fixedly mounted on block 200, and a base clamp 204 attached to one end of a shaft 206 which extends through and is rotatable within block 200.

As was mentioned above in the description of FIGURE 3, the operating clamp driver 140, which is provided with a pair of cam followers 142 and 143 on a face thereof, is mounted on a shaft 141. The shaft 141 is supported in block 208 mounted on upper slide 174. A spring-loaded latch 210, provided with a cam follower 212, is rotatably mounted on block 208 in operative relationship with respect to the operating clamp driver 140. The shaft 141, on one end of which the operating clamp driver 140 is mounted, is connected at its other end, within the block 208, to a universal joint 214. The universal joint 214 is connected to shaft 206 through a torque assembly, designated generally by the reference numeral 216 in FIGURE 7, and shown partly in section in FIGURE 8. The torque assembly, as shown in FIGURE 8, comprises a collar 218 connected to the universal joint 214 and having a pin 220 projecting therefrom, a collar 222 connected to shaft 206 and having a sleeve 224 projecting therefrom, within which pin 220 telescopes freely, and a spring 226 concentric with sleeve 224, one end of the spring being fixed to collar 218 and the other end thereof being fixed to collar 222.

As was mentioned above in the description of FIGURE 3, the operating clamp driver 140 is actuated during an operating cycle of the apparatus first by the base clamping cam assembly 144 to secure a base in the base clamping device 153 and, upon completion of the base threading operations, by the base releasing cam assembly 146 to release the base from the base clamping device. Since the assemblies 144 and 146 are substantially the same in structural detail as well as in function, only one of them will be described. The assembly as shown in FIGURE 8 comprises a mounting bracket 228 attached to the adjacent end pedestal 4, a cam mounting plate 230 attached to the bracket 228, and a switching cam arm 232 rotatably supported at one end on a pin 234 depending from bracket 228 and provided at its other end with a switching cam 236. A block 238 attached to and depending from mounting bracket 228 supports means for spring loading the switching cam arm as described below in connection with the description of FIGURE 13.

Figure 9:
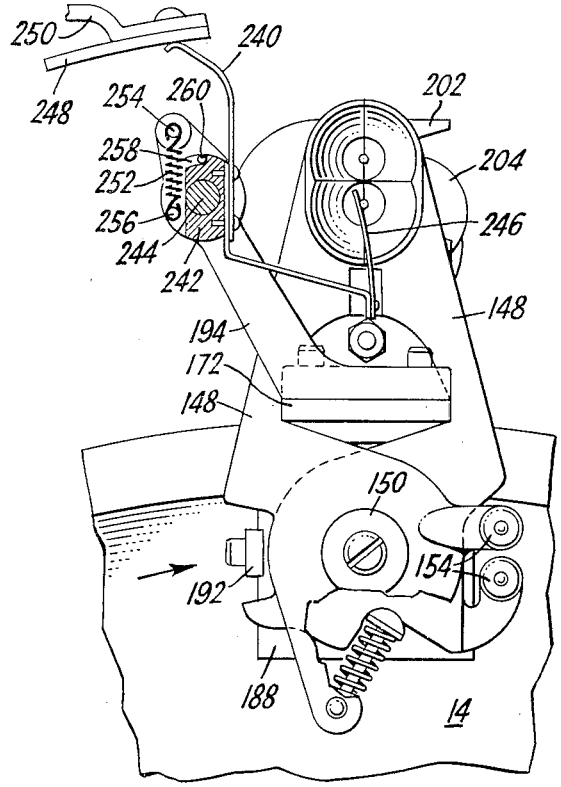
FIGURE 9 is a front elevational view of the switching device assembly which controls the operation of the lamp tube rotating unit and the jaw of the lamp head arm.

Reference is now made to FIGURE 9 in which the switching device 122 is shown in detail and to FIGURES 7 and 8 in which the switching device is also illustrated. As was mentioned above in connection with the description of FIGURES 7 and 8, the switching device 122 is mounted on bracket 194 attached to lower slide 172. A pair of electrical contact fingers 240 are attached, intermediate their ends, to a collar 242 of insulating material on pin 244 rotatably supported on bracket 194. A feeler wire 246 is attached to an end of each of the fingers 240. The other ends of the electrical contact fingers 240 make wiping contact with a pair of commutator tracks 248 attached to but insulated from a supporting arm 250, a fragmentary portion of which is shown. The arm 250 is fixed to a suitable stationary member not shown. It may, for example, be mounted on the base weldment 2. The collar 242 is spring-loaded by spring 252, one end of which is attached to a pin 254 on bracket 194 and the other end thereof being attached to a pin 256 on collar 242. A portion of the periphery of collar 242 is cut away to define a pair of shoulders 258, one of which is shown in FIGURE 9. A pin 260, mounted on bracket 194, lies within this cutaway portion and, in combination with the shoulders 258, constitutes a means for defining rotational limits of the collar 242.

Figure 10:
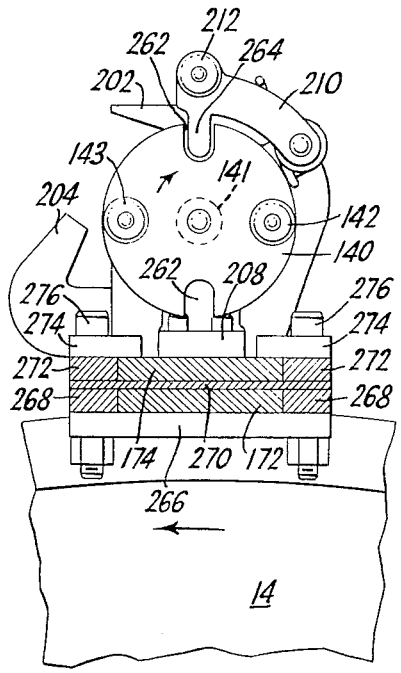
FIGURE 10 is an end view of the threading head assembly looking in the direction 10—10 of FIGURE 8.

Locking of the operating clamp driver 140 by the spring-loaded latch 210 and the mounting arrangement of the threading head assembly on the threading head spider 14 are illustrated in FIGURE 10. The operating clamp drive 140 is provided with a pair of notches 262, spaced 180 degrees apart, for alternately receiving dog 264 of latch 210 during base clamping and base releasing. The mounting arrangement of the threading head assembly on the threading head spider 14 comprises a base plate 266 secured to spider 14, guide bars 268 between which lower slide 172 is disposed, a filler plate 270, guide bars 272 between which upper slide 174 is disposed, and slide retaining bars 274 which overlie a portion of the upper slide 174 along the longitudinal edges thereof. The guide bars 268, filler plate 270, guide bars 272 and slide retaining bars 274 are secured to one another and to base plate 266 by screws 276.

Figure 11:
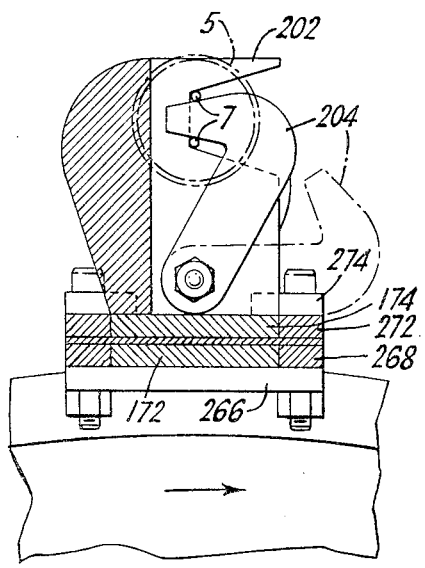
FIGURE 11 is an end view of the threading head assembly looking in the direction 11—11 of FIGURE 8.

A detail of the base clamping device, identified heretofore with the general reference number 158, is illustrated in FIGURE 11. The base clamp 204 is shown in phantom in the open position and in solid in the closed position. As may be noted in FIGURE 11, the base holder 202 is provided with a slot in a longitudinal edge thereof to permit entry thereinto of the forward tip of base clamp 204. Thus the tapered tip of base clamp 204 moves between pins 7 of base 5 and enters the slotted base holder 202, thereby securely locking base 5 in the base clamping device. As may be noted in FIGURE 11, the base clamp 204 rotates through less than 90 degrees in moving from the open to the closed position, while the operating clamp driver 140 (FIG. 10) which actuates the base clamp 204 moves through 180 degrees. The torque assembly 216 (FIGS. 7 and 8) is provided to take up the difference.

Figure 12:
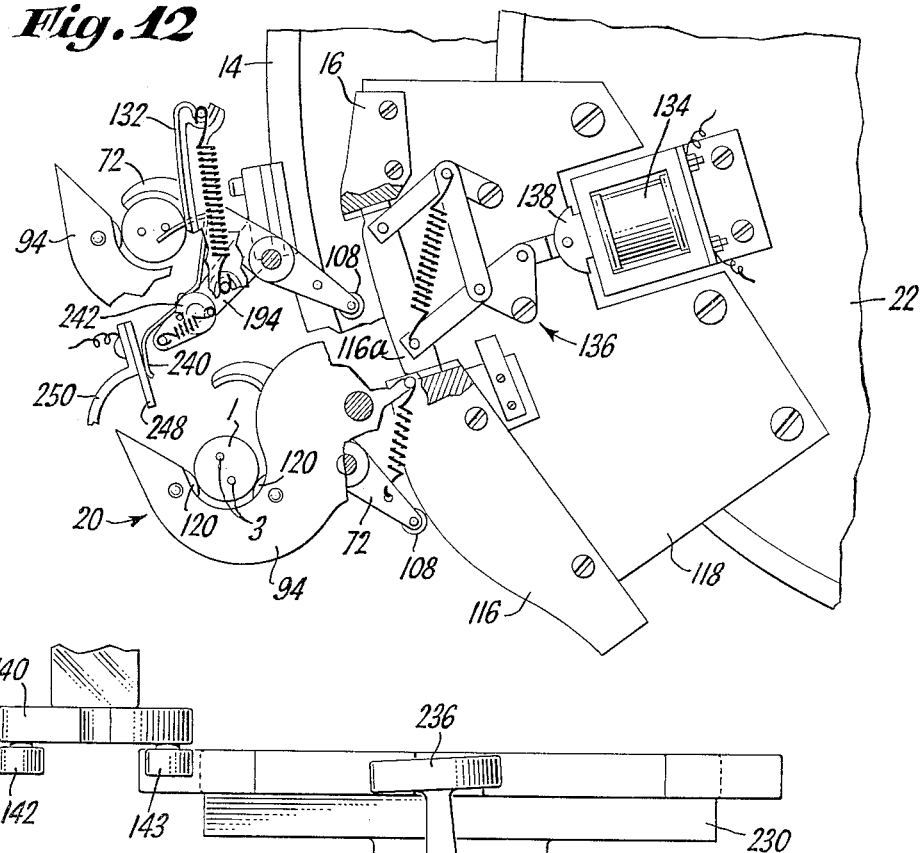
FIGURE 12 is a fragmentary detail on an enlarged scale of the mechanisms employed to control actuation of the lamp tube rotating unit and the jaw of the lamp head arm.

A fragmentary detail, on an enlarged scale, and partly in section, of the mechanisms involved in effecting preliminary orientation of the lamp tube lead-in wires by rotation of the lamp tube immediately after loading, and clamping of the lamp tube in position, is illustrated in FIGURE 12. Since most of the individual pieces of these mechanisms have been previously identified and described above in connection with the description of some of the preceding figures, they will not be described again in detail at this point. As shown in FIGURE 12, as the cam follower 108 on jaw 72 of the lamp head assembly 20 rides off of cam 116 and onto the retractable cam segment 116a, the lamp tube 1 moves into frictional engagement with the shoe facing 132 which causes the lamp tube 1 to rotate, and at the same time, the electrical contact fingers 240 are deflected by the commutator tracks 248 which lie in their path, thus causing counter-clockwise rotation of the switching device 122. The counter-clockwise rotation of the switching device brings the feeler wires 246 attached to an end of each of the electrical contact finers 240 into operative position with respect to the lead-in wires 3 of the lamp tube 1 and also insures a firm wiping contact of the electrical contact fingers 240 on the commutator tracks 248.

When the shoe facing 132 has rotated the lamp tube 1 to a position where one of the lead-in wires extending therefrom has been brought into engagement with the feeler wires 246, the electrical circuit through the contact fingers 240 and the commutator tracks 248 to the solenoid 124 (FIG. 2) of the lamp tube rotating unit 70 on the one hand, and to the solenoid 134 (FIG. 12) on the other hand is closed. Closing of this circuit energizes the solenoids 124 and 134, causing retraction of their respective plungers 126 and 138. Retraction of plunger 126 (FIG. 2) of solenoid 124 withdraws shoe facing 132 from frictional engagement with the lamp tube 1, thereby terminating lamp tube rotation. Retraction of plunger 138 (FIG. 12) of solenoid 134 withdraws cam segment 116a, through linkage 136, from engagement with cam follower 108 on the spring-loaded jaw 72, thus permitting the jaw 72 to snap closed and lock the lamp tube 1 in the arm 94.

Figure 13:
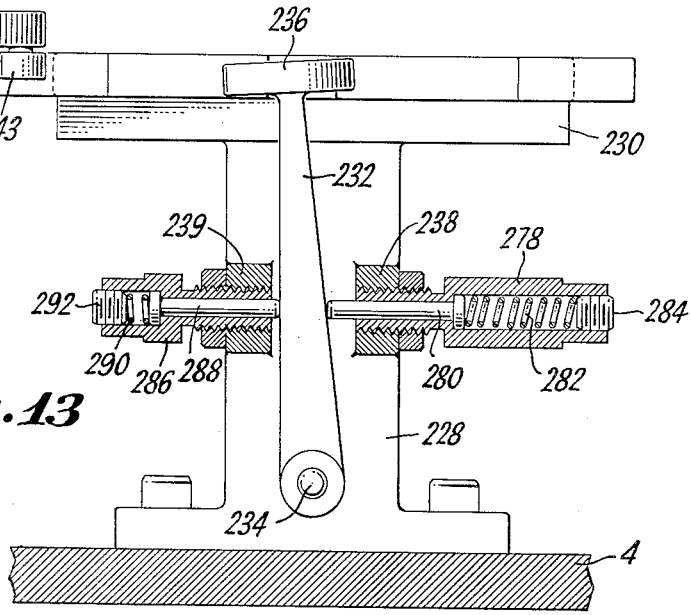
FIGURE 13 is a fragmentary detail, partly in section of the switching cam arm assembly.

In FIGURE 13, the means for spring loading the switching cam arm 232, mentioned above in connection with the description of FIGURE 8 is illustrated. As was explained above in connection with the description FIGURE 8, the operating clamp driver 140, having a pair of cam followers 142 and 143 mounted thereon, is actuated to effect closing and opening of the base clamping device 158 by the base clamping cam assembly 144 (FIG. 3) and the base releasing cam assembly 146 (FIG. 3) respectively. The cam assembly 144 described above in connection with FIGURE 8 and further illustrated in FIGURE 13, includes a block 238 which supports the means for spring loading switching cam arm 232, on the free end of which switching cam 236 is mounted. A sleeve 278 is threaded into the block 238. A plunger 280, disposed within sleeve 278 and projecting from one end thereof, is loaded by a spring 282, one end of which abuts the head of the plunger, the other end thereof abutting screw 284 which closes the other end of the sleeve. A sleeve 286 is threaded into block 239. A plunger 288, disposed within sleeve 286 and projecting from one end thereof, is loaded by a spring 290, one end of which abuts the head of the plunger, the other end thereof abutting screw 292 which closes the other end of the sleeve.

FIGURES 14–17 inclusive are fragmentary details, partly in section, illustrating in step-by-step fashion, the actuation of an operating clamp drive 140 which, as has been described above, constitutes the means for closing and opening a base clamping device 158 (FIG. 3). The operating clamp driver 140 is part of a threading head assembly 16 mounted on threading head spider 14 which rotates with the main shaft 8 (FIGS. 1a and 1b), whereas the cam assemblies 144 and 146 (FIG. 3) which actuate the operating clamp driver 140 are mounted on the fixed end pedestals 4. Thus actuation of the operating clamp driver 140 is effected when it is carried past the aforementioned cam assemblies by the threading head spider 14 in the direction of the arrows in FIGURES 14–17 inclusive. Each of the cam assemblies includes a dog release cam 294 and a pair of operating clamp driver cams 296 and 298, all three being mounted on the cam mounting plate 230 (FIGS. 8 and 13).

Figure 14:
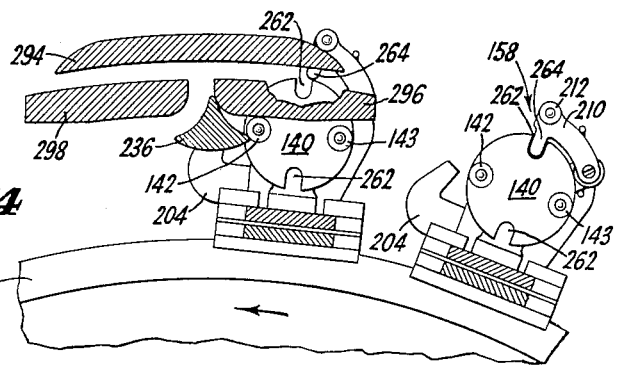
Figure 15:
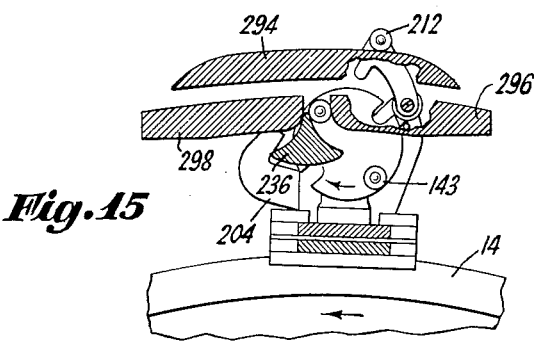
Figure 16:
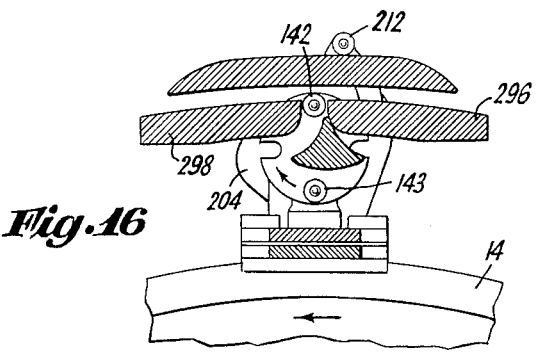
Figure 17:
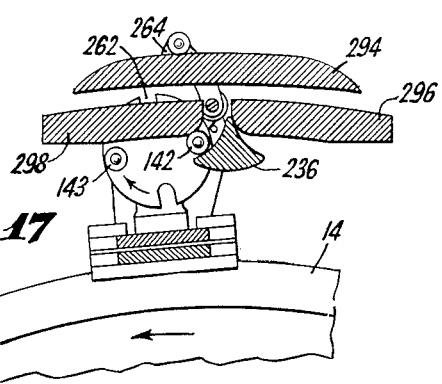

Referring now particularly to FIGURE 14, the cam follower 212 on the spring-loaded latch 210 rides up on dog release cam 294 thereby effecting withdrawal of dog 264 from notch 262 in operating clamp driver 140 and thus permitting the operating clamp driver 140 to be rotated. Cam follower 142 rides along cam 296 and moves into engagement with switching cam 236 which lies in its path. Since, as was mentioned above in the description of FIGURES 8 and 13, the switching cam 236 is mounted on a spring-loaded switching cam arm 232, the cam follower 142 displaces the switching cam 236 to the left in FIGURES 14 and 15 and rides up between the switching cam 236 and the cam 296 (FIG. 15). At this point, the switching cam arm 232 (FIG. 13) has been displaced to the right, placing a load on spring 282. When the cam follower 142 reaches the end of its travel along cam 296 (FIG. 16) it has moved out of engagement with switching cam 236, thus permitting the spring-loaded plunger 280 (FIG. 13) to return the arm 232 and the switching cam 236 to their normal rest positions as shown in FIGURES 13 and 16, the plunger 288 in FIGURE 13 serving as a buffer on the return stroke of the arm 232. As the spider 14 continues its travel in the direction of the arrow in FIGURE 17, the cam follower 142 moves through the path defined by the adjacent faces of switching cam 236 and cam 298, and then along cam 298 to the end thereof. As the cam follower 142 approaches the end of cam 298, the 180 degree rotation of operating clamp driver 140 has been effected and the notch 262 has been moved into register with dog 264 of spring-loaded latch 210 which then snaps into locking position therewith.

The sequence of the base threading operation is illustrated in FIGURES 18–21 inclusive. The base threading operation is accomplished by revolving the lamp tube 1 as shown in FIGURES 6a, b, c and d, and at the same time, advancing the threading head assembly 16 into operative relationship with respect to the lead-in wires 3 extending from the end of the lamp tube 1.

As was mentioned above, in the description of FIGURES 4–6, revolution of the lamp tube 1 is triggered by rod 82, the free end of which lies in the path of roller 92 on lamp head arm 94. When lamp head arm 94 moves past rod 82, the force exerted by the free end of rod 82 on roller 92 displaces the arm 94 downwardly a distance sufficient to actuate the mechanism illustrated in FIGURE 18.

The mechanism for revolving the lamp tube, which is disposed in a housing 300 mounted on the lamp head spider 18, comprises a crank 302, the shank portion of which is rotatable in bearings in bearing housing 304 on arm 94 and has a screw 306 threaded therein to. Actuation of the crank 302 is effected by a friction disc 308 which is in frictional engagement with a face of the head of the crank and which is loaded by springs 310 seated in pockets therefor in a head 312 of shaft 314. The head of crank 302, the friction disc 308 and head 312 of shaft 314 are enclosed in a shell 316 and retained therein by retaining ring 317. The shaft 314 is supported in bearings 318, and is driven by pinion 48 which is keyed thereto, the pinion 48 in turn being driven by gear 40.

Since, as was mentioned above in the description of FIGURES 1a and 1b, the gear 40 is driven by sprocket 42, gear 40 and pinion 48 are rotating continuously during the complete operating cycle of the apparatus. Thus shaft 314 in FIGURE 18 rotates continuously during the entire operating cycle of the apparatus and this rotational motion is transmitted to crank 302 through the spring-loaded friction disc 308, and the shank of crank 302 rotates in a true circle within bearing housing 304 on arm 94. However, when arm 94 is displaced downwardly by the rod 82, the free end of which lies in the path of roller 92 on arm 94, the crank 302 is thrown off center, thereby initiating revolution of the lamp tube, as shown in FIGURES 6a, b, c and d.

With the lamp tube 1 revolving, the threading head assembly 16 is moved into operative relationship with respect to the lamp tube lead-in wires 3. The threading head assembly 16 is shown in the rest position in FIGURE 18; it is also in the rest position in FIGURES 7 and 8. The first step in the advancement of the threading head assembly 16 is the advancement of the upper slide 174 by its cam follower 180 which rides on bar cam 182. This advances the base 5, held in the base clamping device 158 mounted on slide 174, into abutting relationship with the truncated apex of the second threading cone. The upper slide 174 continues its inward travel and carries with it the lower slide 172, and the threading cones mounted thereon, through screw 184, thus bringing the jaws 148 of the first threading cone into encompassing relationship with respect to the lead-in wires 3 of the lamp tube 1 and drawing the lead-in wires closer to one another.

When the slides 172 and 174 have advanced a distance sufficient to bring the second threading cone jaws 152 into encompassing relationship with respect to the lead-in wires 3 as shown in FIGURE 19, the cam followers 154 on the jaws 148 encounter the cam 96 lying in their path and are displaced thereby, thus effecting rotation of the jaws 148 on the shaft 150 and opening of the cone (FIG. 3).

Further inward travel of the slides 172 and 174 causes the second threading cone jaws 152 to draw the lead-in wires closer to one another and into axial alignment with the pins 7 of base 5 until finally they enter the pins as shown in FIG. 20. The lower slide 172 only is then advanced by its cam follower 176 riding on bar cam 178 to withdraw the second threading cone jaws 152 from abutting relationship with the base 7. When the jaws 152 have cleared the base 7, they are opened by the cam 100 which lies in the path of the cam followers 156 on these jaws (FIG. 20).

With both the first and the second threading cones now open and the free ends of the lead-in wires 3 extending into the base pins 7 as shown in FIGURE 20, the upper slide 174 is advanced by its cam follower 180 a distance sufficient to bring the base 5 into engagement with the end of the lamp tube 1 and complete the threading of the lead-in wires through the base pins as shown in FIGURE 21. Revolution of the lamp tube is terminated by cam 104 (FIGS. 2 and 3) just before the base engages the end of the lamp tube.

The next operation to be performed is welding of the lead-in wires 3 to the base pins 7. This is accomplished by a welding unit, identified by the general reference numeral 50 in FIGURE 2, mounted on a bracket 51 attached to each end pedestal 4.

Referring now to FIGURES 22, 23 and 24, the welding unit comprises an electrode 320 which is disposed in the path through which one of the lead-in wires 3 travels and an electrode 322 which is disposed in the path through which the other lead-in wire 3 travels, as the arm 94 carries the lamp tube 1 with base 5 disposed on an end thereof through the remainder of the operating cycle of the apparatus. The electrodes 320, 322 are of graphite, carbon or the like, and are preferably of non-metallic material in order to avoid welding of the lead-in wires thereto.

Since the electrode assemblies are the same, only one will be described, reference being made particularly to FIGURE 22. The electrode 322 is mounted on one end of a spindle 324 which extends through a sleeve 326 of insulating material and is rotatable therewith in bearings 328. Nut 330 threaded on sleeve 326 prevents lateral displacement of sleeve 326 and nut 332 threaded on spindle 324 prevents lateral displacement of spindle 324. A shell 334, supported in sealed bearings 336 and 338 on spindle 324, has a plate 340 mounted thereon. Terminal 342 is mounted on plate 340. A torque arm 344 of insulating material connects plate 340 attached to shell 334 to plate 341 attached to shell 335 to prevent the shells 334 and 335 from rotating on their respective spindles 324 and 325. A cup 346 is press fitted in the shell 334, and a cup 348 is press fitted on spindle 324. The chamber in each of the shells 334 and 335 is provided with a filling of mercury which is introduced thereinto through an aperture which is provided with a plug 350. This provides means for establishing and maintaining the electrical circuits from terminals 342 and 343 through the spindles 324 and 325 to electrodes 322 and 320 respectively.

Rotation of spindle 324 is effected by chain 352 which connects sprocket 354 on sleeve 326 to sprocket 356 (FIG. 24) on drive shaft 358 of motor 360. The spindle 325 is also rotated by this same chain drive through a sprocket (not shown) mounted thereon.

Cleaning of the electrodes 320 and 322 is effected by brushes 362 and 364 respectively. Referring now particularly to FIGURE 22, brush 362 is mounted on spindle 366 which is rotatably supported in bearings in bearing housing 368. A sprocket 370 mounted on spindle 366 meshes with chain 352, thereby providing means for rotating brush 362. Similar means are employed for rotating brush 364.

Welding current may be supplied to each of the electrodes 320 and 322 through their respective terminals 343 and 342 by any suitable means. For example, each of the terminals 342 and 343 may be connected directly to one side of a condenser which discharges immediately when a lamp lead-in wire is brought into contact with the face of one of the electrodes 320, 322. Connection to ground is effected through the base clamping device 158 (FIG. 8) within which the base 5 is held, ground wire 52, and the grounding assembly described above and shown in FIGURES 1a and 1b at each end of the main shaft 8 of the apparatus. Any suitable means, well known to those skilled in the art, may be employed to recharge the condensers after each welding operation.

FIGURE 25 is a schematic development illustrating the action of several of the operating devices and the time, in terms of degrees, during one full rotational cycle of the apparatus, when these devices are actuated.

Line A indicates the points of time at which the cam follower 212 (FIGS. 3 and 14) is actuated by its cam, first in the base clamping cam assembly 144 and then in the base releasing cam assembly 146.

Line B indicates the points of time at which cam follower 142 of the operating clamp drive 140 (FIGS. 3 and 14–17) is actuated by the base clamping cam assembly 144, and the cam follower 143 of the operating clamp driver 140 is actuated by the base releasing cam assembly 146.

Line C indicates the points of time and path of travel of the base clamping device 158 (FIGS. 7, 8 and 18–21), which is mounted on upper slide 174.

Line D indicates the points of time and path of travel of the two threading cones 148 and 152 (FIGS. 7, 8 and 18–20) which are mounted on lower slide 172.

Line E represents the center line between the threading cones 148 and 152 (FIGS. 3, 7, 8 and 18–20), which are pivotably mounted on threading cone shaft 150 (FIG. 18).

Line F represents the point of time and duration of the revolution of the lamp tube (FIGS. 3, 6 and 18).

The operation of the apparatus will now be described briefly. Lamp tubes 1 are fed to the apparatus by the paddle wheel feeder 64 (FIG. 2), and are received by the lamp head arms 94 which carry them through an operating cycle of the apparatus. As the lamp tube moves past tube rotating unit 70 (FIG. 2), it is rotated thereby until the lead-in wires 3 of the lamp tube have been brought to a position where one of the lead-in wires moves into engagement with the feeler wires 246 (FIG. 7) of the switching device 122 (FIGS. 3, 7 and 9). When this happens, the circuit therethrough is closed thereby and energizes solenoid 134 (FIGS. 3 and 12) and solenoid 124 (FIG. 2). Energization of solenoid 134 effects a withdrawal of cam segment 116a (FIG. 12) from engagement with cam follower 108 on jaw 72, thus permitting jaw 72 to snap closed on the lamp tube to hold it securely in arm 94. Energization of solenoid 124 (FIG. 2) effects a withdrawal of shoe facing 132 of the tube rotating unit 70 from engagement with the lamp tube, thereby terminating rotation thereof.

Finger 80 (FIG. 2) lies in the path of the lamp tube and is deflected thereby, thus actuating escapement 78 and releasing a base 5 from the base feeding device 74 to the base clamping device 158 (FIGS. 7, 8 and 11).

The operating clamp driver 140 of the base clamping device 158 (FIGS. 3 and 14), locked in position and prevented from rotating by latch 210, is unlocked by cam 294 (FIG. 14) of base clamping cam assembly 144 (FIG. 3), and the switching cam 236 (FIGS. 14–17) of the base clamping cam assembly 144 effects rotation of the operating clamp driver 140 and the base clamp 204 (FIGS. 7, 8 and 11), to which it is connected through torque assembly 216 (FIGS. 7 and 8), to effect a clamping of the base 5 in the base clamping device 158 (FIGS. 7, 8 and 11).

Actuation of the arm 94 and revolution of the lamp tube 1 held therein (FIG. 6) is initiated when the roller 92 on the arm 94 (FIG. 2) is deflected downwardly by the rod 82 which lies in its path. This triggers the mechanism, shown in FIG. 18, which includes a crank 302 which is thrown off center by the action of the rod 82, thus initiating revolution of the lamp tube.

With the lamp tube 1 revolving, the base clamping device 158 (FIGS. 7 and 8) mounted on upper slide 174, and the jaws 148 and 152 of the two threading cones mounted on lower slide 172, are advanced to effect a threading of lead-in wires 3 through the cones and into the pins 7 of the base 5 (FIGS. 18–21). When the threading cones have been advanced to a point where the free ends of the lead-in wires 3 lie within the jaws 152 of the second threading cone (FIG. 19), the jaws 148 of the first threading cone are opened by the cam 96 (FIGS. 3 and 19). When the threading cones, and the base clamping device 158 moving therewith, have advanced to a point where the free ends of the lead-in wires 3 have entered the base pins 7 of the base 5, the lower slide 172 only is advanced slightly to effect a displacement of the threading cones a distance sufficient to clear the base 5 as shown in FIGURE 20. The threading cone jaws 152 are then opened by the cam 100 (FIGS. 3 and 20) and the upper slide 174 is advanced to effect a completion of the threading operation (FIG. 21), revolution of the lamp tube 1 being terminated by the cam 104 (FIG. 3) just before the base engages the end of the lamp tube.

Welding of the lead-in wires to the base pins is now effected by the welding units 50, one of which is shown in FIGURES 2, 22–24. Welding of one of the lead-in wires to the base pin through which it extends is effected by the electrode 320 when the lead-in wire moves into engagement therewith. Welding of the other lead-in wire to the base pin through which it extends is effected by the electrode 322 when the lead-in wire moves into engagement therewith. As shown in FIGURES 22 and 23, the electrodes 320 and 322 not only effect a welding of the lead-in wires to the base pins but they also effect the desired severing of the un-needed portions of the lead-in wires, thus eliminating the requirement for a separate lead-in wire cutting operation prior to welding.

After the welding operation has been completed, the base releasing cam assembly 146 (FIGS. 2 and 3) effects an opening of the base clamping device 158, thereby freeing the base therefrom.

The lamp tube 1, with bases disposed on each end thereof and lead-in wires welded to the base pins, is then released by the jaws 72 (FIG. 2) which is opened by cams 112, and is discharged onto table 114.

In preparation for the next operating cycle, the jaws 148 and 152 of the two threading cones (FIG. 3) are closed by the bar cams 160, thus completing the operating cycle of the apparatus.

What I claim is:

1. The method of locating lead-in wires, extending from an end of an electrical device, in pins of a base which comprises: positioning a base in axial alignment with the device and spaced from the free ends of the lead-in wires; positioning a threader between said base and the free ends of said lead-in wires, and in axial alignment with said base; advancing said base into abutting relationship with said threader; revolving the device about the axis of the threader; effecting relative longitudinal movement, between said device on the one hand and said threader and said base on the other hand, while said device is revolving, whereby the free ends of the lead-in wires enter into and through said threader and into the pins of said base; displacing said threader from abutting relationship with said base; displacing said threader from encompassing relationship with respect to the lead-in wires; and effecting relative movement, along the longitudinal axis of said device, between said device and said base, whereby the free ends of the lead-in wires are caused to pass through the pins of said base.

2. Apparatus for locating lead-in wires, extending from an end of an electrical device, in pins of a base, said apparatus comprising: means for positioning the base in axial alignment with the end of the electrical device and spaced from the free ends of the lead-in wires extending from the device; a threader, disposed between the free ends of the lead-in wires and the base, and in axial alignment with the base; means for revolving the device about the axis of the threader; means for effecting relative longitudinal movement between the device and the base, while the device is revolving, whereby the free ends of the lead-in wires enter into and through said threader and into the pins of the base; means for displacing said threader from encompassing relationship with respect to the lead-in wires; and means for subsequently effecting relative movement, along the longitudinal axis of the device, between the device and the base, whereby the free ends of the lead-in wires are caused to pass through the pins of the base.

3. Apparatus for locating lead-in wires, extending from an end of an electrical device, in pins of a base, said apparatus comprising: a conveyor; means on said conveyor for supporting said electrical device; means on said conveyor for supporting said base in axial alignment with said electrical device and spaced from the lead-in wires extending therefrom; a threader disposed on said conveyor between said electrical device and said base and in axial alignment therewith; means for actuating said conveyor whereby said first-mentioned means, said second-mentioned means and said threader are caused to move therewith through pre-determined paths; means disposed in the path through which said first-mentioned means travels to cause said electrical device to revolve about the axis of said threader; means disposed in the path through which said threader travels to move said threader into encompassing relationship with respect to said lead-in wires and to cause said lead-in wires to extend therethrough, while said device is revolving; and means disposed in the path through which said second-mentioned means travels to advance said base in abutting relationship with respect to said threader, whereby said lead-in wires extending through said threader enter into the pins of said base.

4. Apparatus for locating lead-in wires, extending from an end of an electrical device, in pins of a base, said apparatus comprising: means for positioning the base in axial alignment with the end of the electrical device and spaced from the free ends of the lead-in wires extending from the device; a truncated, segmental, hollow cone having apertures in the truncation thereof, disposed between the free ends of the lead-in wires and the base, with said apertures in axial alignment with the pins of said base; means for revolving the device about the axis of said cone; means for effecting relative longitudinal movement between the device and the base, while the device is revolving, whereby the free ends of the lead-in wires enter into and through said cone and into the pins of the base; means for displacing said cone from encompassing relationship with respect to the lead-in wires; and means for subsequently effecting relative movement, along the longitudinal axis of the device, between the device and the base, whereby the free ends of the lead-in wires are caused to pass through the pins of the base.

5. Apparatus for locating lead-in wires, extending from an end of an electrical device, in pins of a base, said apparatus comprising: a conveyor; means on said conveyor for supporting said electrical device; means on said conveyor for supporting said base in axial alignment with said electrical device and spaced from the lead-in wires extending therefrom; a truncated, hollow, segmental cone having apertures in the truncation thereof, disposed on said conveyor between said electrical device and said base with said apertures in axial alignment with the pins of said base; means for actuating said conveyor whereby said first-mentioned means, said second-mentioned means and said cone are caused to move therewith through pre-determined paths; means disposed in the path through which said first-mentioned means travels to cause said electrical device to revolve about the axis of said cone; means disposed in the path through which said cone travels to move said cone into encompassing relationship with respect to said lead-in wires and to cause said lead-in wires to extend therethrough, while said device is revolving; and means disposed in the path through which said second-mentioned means travels to advance said base in abutting relationship with respect to said cone, whereby said lead-in wires extending through said cone enter into the pins of said base.

References Cited in the file of this patent

UNITED STATES PATENTS

| | | |
|---|---|---|
| 1,817,746 | Gooshens et al. | Aug. 14, 1931 |
| 2,390,139 | Vaselli | Dec. 4, 1945 |
| 2,429,287 | McGowan et al. | Oct. 21, 1947 |
| 2,694,433 | Fulton et al. | Nov. 16, 1954 |
| 2,720,690 | Mullan et al. | Oct. 18, 1955 |
| 2,729,877 | Roeber et al. | Jan. 10, 1956 |
| 2,749,528 | Albrecht | June 5, 1956 |